United States Patent [19]
Ritzerfeld

[11] 3,749,490
[45] July 31, 1973

[54] COPYING APPARATUS WITH DIFFERENT RADIATION SOURCES

[76] Inventor: Gerhard Ritzerfeld, Schorlemer Allee 14, Berlin, Germany

[22] Filed: July 17, 1970

[21] Appl. No.: 55,697

[30] Foreign Application Priority Data
July 29, 1969 Germany.................. P 19 39 171.0

[52] U.S. Cl..................... 355/89, 355/100, 355/106
[51] Int. Cl. ............................................ G03b 27/04
[58] Field of Search....................... 355/89, 12, 100, 355/106, 46; 250/65 T

[56] References Cited
UNITED STATES PATENTS
3,230,857  1/1966  Ritzerfeld et al. ................ 355/89 X
3,372,617  3/1968  Pfaff ..................................... 88/24

Primary Examiner—Samuel S. Matthews
Assistant Examiner—Richard L. Moses
Attorney—Michael S. Striker

[57] ABSTRACT

A copying apparatus comprises a first copying device including a source of visible light, a second copying device including a source of invisible heat radiation, and a third copying device including a source of infrared radiation. An original is placed, together with a light sensitive copy sheet, in the first copying device so that a negative image is formed on the copy sheet. The negative copy sheet is placed together with a heat sensitive positive copy sheet in the second copying device so that a positive image of the negative image is formed on the heat sensitive copy sheet. The copy sheet with the positive image is placed together with another sheet, in the third copying device for producing a copy suitable for use as a hectographic master sheet.

10 Claims, 2 Drawing Figures

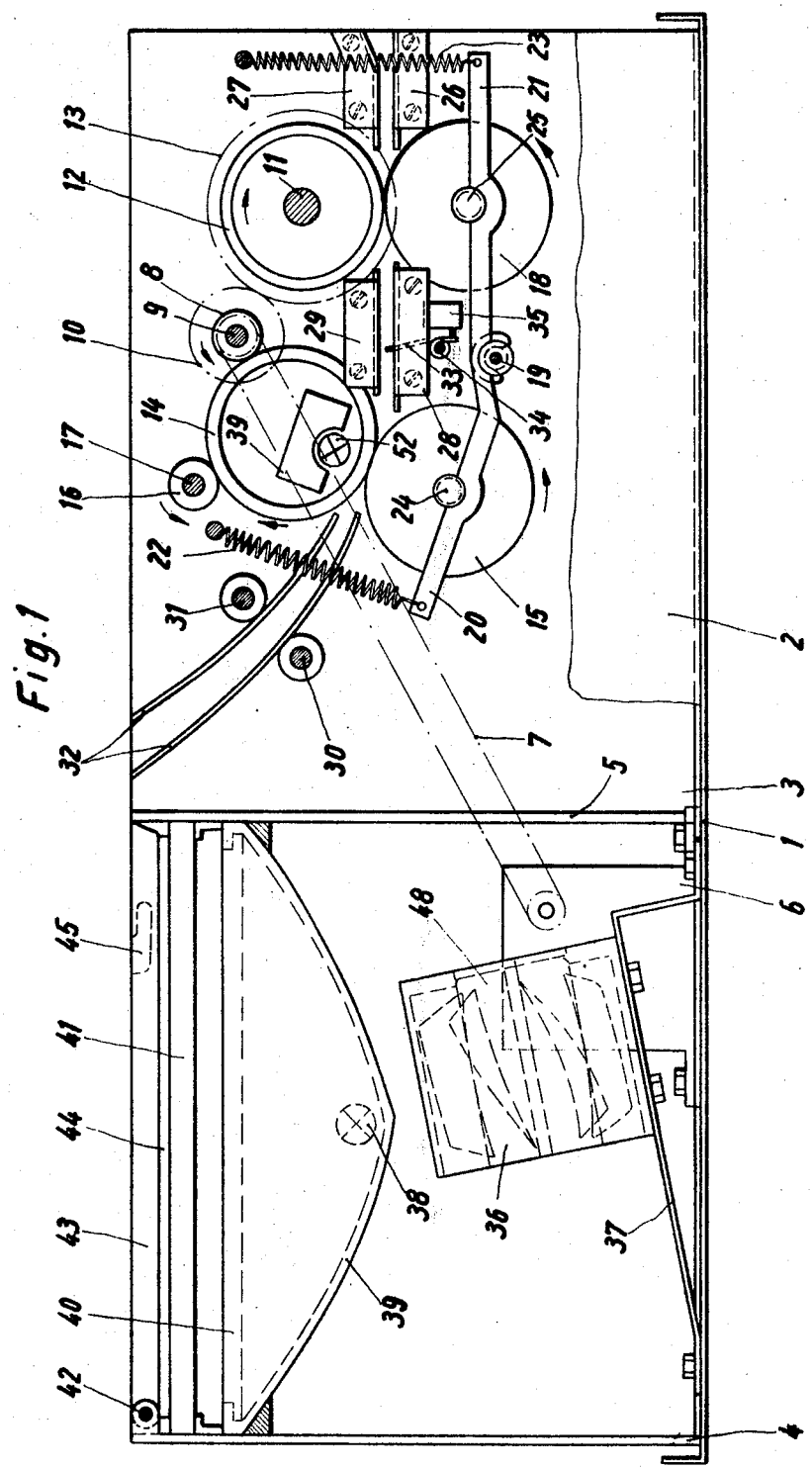

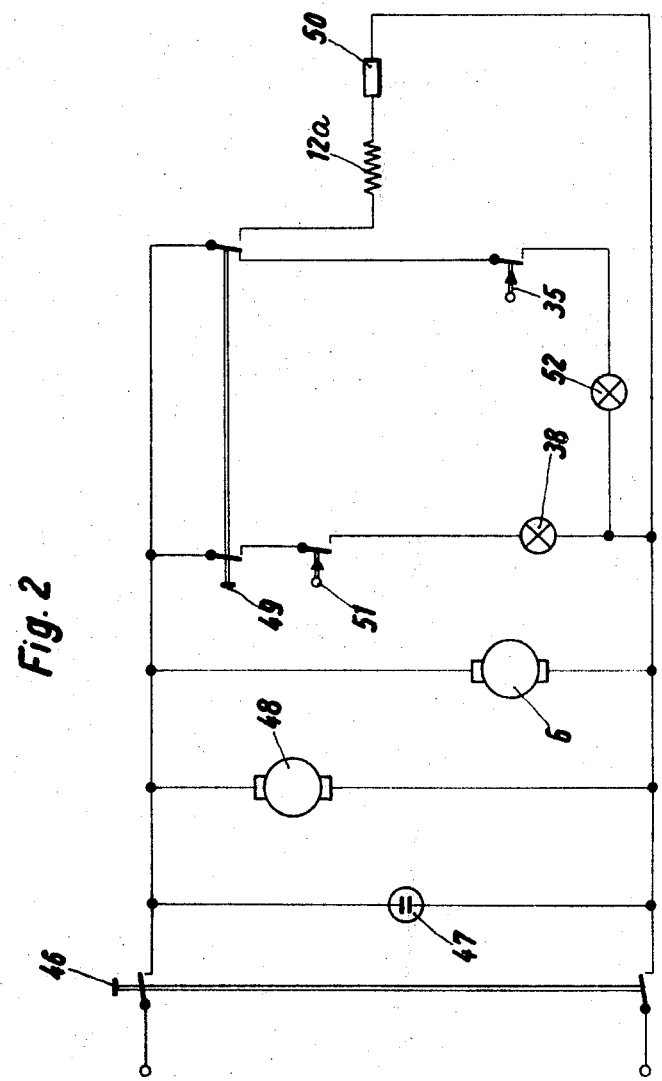

COPYING APPARATUS WITH DIFFERENT RADIATION SOURCES

BACKGROUND OF THE INVENTION

Copying apparatus is known which includes an exposing device, and a thermo copier for first producing a negative intermediate copy, from which a positive copy can be made on a heat sensitive sheet. Apparatus of this type does not permit the making of hectographic master sheets from the positive copy, due to the low heat developed by the invisible heat radiation used in apparatus of this type. For making the hectographic master sheet, a separate copier with a source of infrared radiation is required. On the other hand, the copier with the infrared radiation does not permit the making of thermocopies, or of hectographic master sheets from originals whose images are heat absorbing.

Other copying apparatus is known which includes an exposing device, a developing device employing a developing liquid, and an infrared radiator. This apparatus produces a negative of an original exposure by light, and this negative is developed into a positive in the developing liquid. It is then possible to make thermocopies of this positive by means of an infrared radiator. Copying apparatus of this type has the great disadvantage that the developing liquid is spoiled after a certain time, and that the treated copies are soiled. Also, the moist or wet copies take certain time until drying.

SUMMARY OF THE INVENTION

It is one object of the invention to overcome the disadvantages of prior art copying apparatus, and to provide an apparatus capable of making positive copies of a desired quality without the use of a developing liquid.

Another object of the invention is to provide a copying apparatus with different radiation sources.

Another object of the invention is to provide a copying apparatus in which several successive operations can be carried out by a plurality of copying devices located in a common housing.

With these objects in view, one embodiment of the invention comprises a first copying device including a source of visible light for making a negative image on a light sensitive sheet, a second copying device including a source of invisible radiation for making on a heat sensitive sheet, a positive image of the negative image, and a third copying device including a source of infrared radiation for making a copy of the positive image having particular properties.

In the preferred embodiment of the invention, the source of visible light of the first copying device is a halogen lamp, and the source of heat radiation of the second copying device includes electric resistant coils.

In the preferred embodiment of the invention, the second and third copying devices, which are both thermo copiers, have a common guide means for sheets, and transport the sheets from an inlet to an outlet of the housing along a path formed by guide means.

It is advantageous to use a source of heat radiation in the form of a transporting roller for the sheets, and to place the source of infrared radiation in a transparent tubular roller which also serves for transporting the sheets. The rollers of the second and third copying devices are effective to transport the sheets, irrespective of the fact that only either the infrared radiation, or the heat radiation is effective at any time.

Common drive means for the transporting means of the two thermo copying devices are provided and a control circuit, including switch means, is connected with the three sources of radiation and connected in such a manner that the three sources are successively energized, while the respective other sources are deenergized.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a side elevation of a copying apparatus according to an embodiment of the invention showing a side wall of the housing broken off; and FIG. 2 is a diagram schematically illustrating the electric circuit of the embodiment of FIG. 1.

DESCRIPTION OF THE PREFERRED EMBODIMENTS

The housing of the copying apparatus shown in FIG. 1 includes a bottom wall 1, lateral walls 2 and 3, front and rear walls 4, and a partitioning wall 5. A drive motor 6 is mounted on the bottom wall 1, and rotates a drive roller 8 through a pulley and belt transmission 7. A pinion 10 is secured to the shaft 9 of drive roller 8, and meshes with a gear 13 which is secured to the shaft 11 of a heater roller 12. Roller 12 is either heated by electric resistant coils 12a see FIG. 2, or is an opaque tube heated by an infrared radiator, not shown, in the interior thereof so that roller 12 produces invisible heat radiation and no light radiation.

A tubular roller 14, consisting of a transparent material, such as glass, envelopes a source of infrared radiation 52, and a reflector 39 which are stationarily mounted on the side walls 2 and 3. A holding roller 16 has a shaft 17 rotatably mounted in side walls 2 and 3, and is in rolling contact with the tubular transparent roller 14.

Two pressure rollers 15 and 18 which respectively cooperate with rollers 14 and 12, have shafts 24 and 25 respectively mounted in open bearings of supporting levers which are pivotally mounted on a shaft 19 secured to the side walls 2 and 3, and have front and rear portions 21 and 20 respectively biassed by springs 23 and 22 into rolling contact with rollers 12 and 14. Due to the fact that the tubular transparent roller 14 is supported at three points of its periphery by rollers 15, 8 and 16, no shaft is required for the tubular roller 14. A pair of upper and lower guide means 27 and 28 forms an inlet for sheets leading to the rollers 12 and 18, which act as transporting rollers for transporting sheets to the upper and lower guide means 29 and 30 from which the transported sheets are further transported into engagement with the cooperating rollers 15 and 14 and transported by the same into a guide passage 32 consisting of two curved sheets carried by shafts 30 and 31 supported on the side walls 2 and 3.

All rollers are rotated by the drive roller 9 in the directions indicated by the arrows so that sheets inserted between guide means 27 and 26 are continuously transported along the guide means 29, 28 and 32 and out of the housing through an outlet in the top wall of the casing.

A feeler 33 is mounted on a shaft 34 for pivotal movement, and is operated by sheets passing between guide means 29 and 28 to actuate a switch 35 which, under certain circumstances, effects energization of the source of infrared radiation 52, as will be explained hereinafter.

A fan or blower 36 is mounted on a supporting bracket 37 on the bottom wall of the rear portion of the housing, and cools the interior of the same. Above the blower 36, a copying device is arranged in the top portion of the housing, which includes a source of visible light 38, for example a halogen lamp, a reflector 39, a glass plate 40, a transparent support plate 41 for sheets, which may also consist of glass, and a cover 43 pivotally mounted for angular movement about a shaft 42, and having on its bottom face a resilient pressure cushion 44. A handle 45 permits the lifting of the cover 43.

Referring now to FIG. 2, a main switch 46 opens and closes both terminals of the voltage source. When main switch 46 is closed, a signal lamp 47 is illuminated indicating to the operator that the motor 48 of blower 36, and also drive motor 6 have started to operate. A switch 49 has two movable contacts, one of which is connected in series with a switch 51 and the halogen lamp 48, while the other contact is connected in series with the feeler switch 35 and the infrared lamp 52. In the shifted condition of switch 49, the electric resistance coil 12 and a resistor 50 are connected in series with the voltage source.

To start an operation, the main switch 46 is closed, so that signal lamp 47 is illuminated, and motor 48 of blower 36 and drive motor 6 are started. Switch 49 is now manually operated and shifted from the position illustrated in FIG. 2 to its other position in which the circuit of the halogen lamp 38 is prepared, but not yet closed due to the fact that switch 51 is open. However, the electric resistance coil 12a of the source of heat radiation which heats roller 12 in FIG. 1, is energized so that the roller 12 can warm up and reach the temperature required for the proper operation.

Thereupon, switch 51 is operated, for example manually, and for a selected time, so that the source of visible light 38, for example a halogen lamp, is energized. After an exposure has been taken place in the first copying device 38 to 45, switch 51 is again opened, the halogen lamp 38 is extinguished, and the second copying device 12, 18 can be used since the source of invisible heat radiation 12, 12a is already energized. When switch 49 is again opened, the electric heating device 12 is again de-energized. When sheets transported by rollers 12 and 18 move through guide means 29, 28, feeler 33 is operated, and switch 35 is closed so that the source of infrared light 52 of the third copying device 14, 15, 52, 39 is energized.

At the beginning of an operation, an original having a written or printed text or other image in any color, which need not be heat absorbing, is placed in the copying device 38 to 44 together with a light sensitive sheet, which may consist of paper of film, so that due to the exposure by the lamp 38, a negative copy is made on the light sensitive sheet. The sheet with the negative copy is superimposed on a heat sensitive positive paper sheet, and inserted through the inlet 27, 26 so that the transporting rollers 12, 18, of which transporting roller 12 is opaque and heated by resistor 12a, transport the superimposed sheet toward the guide means 28, 29 where the superimposed sheets are gripped by the transporting rollers 14, 15, of which transporting roller 14 is transparent and tubular. Since the source 52 of infrared radiation 52 is disconnected from the voltage source by switch means 49, which connect the electric heating means 12a to the voltage, the superimposed sheets are not subjected to infrared radiation while being transported by transporting roller means 14, 15 through the guide means 32 to the outlet on top of the housing. Due to the heating by the electric heating means 12a which heat transporting roller 12, a positive copy is made on the heat sensitive sheet.

Switch 49 is now operated to disconnect the electric heating means 12a and to prepare the circuit of the feeler switch 35. The positive copy, superimposed on another sheet, is now inserted into the inlet 26, 27, transported by the transporting roller means 12, 18 to the guide means 28, 29, where the sheets operate the feeler switch 33, 35 so that the infrared lamp 52 is energized, and the two superimposed sheets are irradiated with infrared light, whereupon the sheets are transported through the guide means 32 out of the outlet of the housing.

During this run, a wax dispersion sheet can be used together with the positive copy so that a plain thermocopy is made, or a hectographic inked sheet and a transfer sheet are inserted with the positive copy so that a hectographic master is produced when the sheets pass through the infrared radiation of source 52. Due to the absorption of heat by the positive image of the positive copy, the hectographic ink layer is transferred from the inked sheet to the transfer sheet.

It is possible to directly transport the positive copy out of the housing without passage between the transporting rollers 14 and 15, but the above-described embodiment is preferred.

The source of infrared radiation may be replaced by an electric resistance coil.

In accordance with a modification of the invention, the transporting roller 12 is not heated by electric resistance wires 12a, but is tubular and opaque, and envelopes an infrared radiator so that the same is heated and produces invisible heat radiation. Such an arrangement requires a much shorter warm up and cool off time than an electric heating coil.

The apparatus of the invention permits the making of thermographic copies, or of hectographic masters in a dry copying process, even of colored originals, and of originals which are not heat absorbing, by means of a single apparatus.

It will be understood that each of the elements described above, or two or more together, may also find a useful application in other types of copying apparatus for making hectographic masters differing from the types described above.

While the invention has been illustrated and described as embodied in a copying apparatus including three copying devices employing different radiations for successive operations, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Copying apparatus having three separate sources of radiation for use sequentially to produce a copy comprising a first copying device including a first electric source of visible light for making a negative copy of an original on a light sensitive sheet; a second copying device including a second electric source of invisible heat radiation for making a positive copy of said negative copy on a heat sensitive sheet; a third copying device including a third electric source of infrared radiation for making a thermocopy of said positive copy on a sheet sensitive to infrared radiation; and circuit means connecting said first, second, and third electric sources, and including switch means for energizing said first electric source to make a negative copy of said original, for energizing said second electric source to make a positive copy of said negative copy on a heat sensitive sheet, and for finally energizing said third electric source for making a thermocopy of said positive copy on a sheet sensitive to infrared radiation, said switch means controlling said circuit means to deenergize said second source before energizing said third source, and to energize said second source for a warmup period before energizing said first and third electric sources.

2. Copying apparatus as claimed in claim 1 comprising a common housing means at least for said second and third copying devices; wherein said second and third copying devices include transporting means for transporting sheets, and guide means for guiding transported sheets into, through, and out of said housing means irrespective of which of said second and third sources is energized; and comprising drive means for said transporting means.

3. Copying apparatus having three separate sources of radiation for use sequentially to produce a copy comprising a first copying devide including a first electric source of visible light for making a negative copy of an original on a light sensitive sheet; a second copying device including a second electric source of invisible heat radiation for making a positive copy of said negative copy on a heat sensitive sheet; a third copying device including a third electric source of infrared radiation for making a thermocopy of said positive copy on a sheet sensitive to infrared radiation; circuit means connecting said first, second, and third electric sources, and including switch means for energizing said first electric source to make a negative copy of said original, for energizing said second electric source to make a positive copy of said negative copy on a heat sensitive sheet, and for finally energizing said third electric source for making a thermocopy of said positive copy on a sheet sensitive to infrared radiation; and common housing means at least for said second and third copying devices; said second and third copying devices including transporting means for transporting sheets, guide means for guiding transported sheets into, through, and out of said housing means irrespective of which of said second and third sources is energized, and drive means for said transporting means; said transporting means of said third copying device including a transparent tubular roller; said third source of infrared radiation being located in said transparent tubular roller; said transporting means of said second copying device including a transporting roller driven by said drive means; and said second source of heat radiation including electric heating means for heating said transporting roller whereby said sheets are transported by said tubular roller and by said transporting roller along said guide means through said second and third copying means although only one of said second and third sources is energized.

4. Copying apparatus as claimed in claim 3 wherein said transporting roller is tubular and opaque; and wherein a source of infrared radiation is located in said tubular transporting roller.

5. Copying apparatus as claimed in claim 3 wherein said electric heating means include electric wires for heating said transporting roller.

6. Copying apparatus having three separate sources of radiation for use sequentially to produce a copy comprising a first copying device including a first electric source of visible light for making a negative copy of an original on a light sensitive sheet; a second copying device including a second electric source of invisible heat radiation for making a positive copy of said negative copy on a heat sensitive sheet; a third copying device including a third electric source of infrared radiation for making a thermocopy of said positive copy on a sheet sensitive to infrared radiation, said third source including a light impermeable opaque tube and a source of heat radiation in said tube; and circuit means connecting said first, second, and third electric sources, and including switch means for energizing said first electric source to make a negative copy of said original, for energizing said second electric source to make a positive copy of said negative copy of a heat sensitive sheet, and for finally energizing said third electric source for making a thermocopy of said positive copy on a sheet sensitive to infrared radiation.

7. Copying apparatus as claimed in claim 6 wherein said first source is a halogen lamp.

8. Copying apparatus comprising housing means having an inlet and an outlet for sheets; a heat radiation copying device including opaque transporting roller means located in said housing means adjacent said inlet for transporting superimposed sheets into said housing means, and electric heating means for heating said opaque transporting means; an infrared radiation copying device including transparent transporting roller means located in said housing means adjacent said outlet means for transporting said superimposed sheets out of said outlet, and a source of infrared radiation in said transparent roller means; drive means for simultaneously driving said opaque and transparent roller means; and circuit means connecting said electric heating means and said source of infrared radiation, and including switch means having a first position for energizing said electric heating means while de-energizing said source of infrared radiation so that when a negative and a heat sensitive sheet are supplied through said inlet, said opaque and transparent transporting roller means transport the same out of said outlet while a positive copy is made on said heat sensitive sheet by said heat radiation copying device, said switch means having a second position for de-energizing said electric heating means and energizing said source of infrared radiation so that when said sheet with said positive copy and another sheet are supplied through said inlet, said opaque and transparent transporting roller means transport the same out of said outlet while a copy of said positive copy is made on said other sheet by said infrared radiation copying device.

9. Copying apparatus comprising housing means having an inlet and an outlet for sheets; a heat radiation copying device including first transporting means located in said housing means adjacent said inlet for transporting superimposed sheets into said housing means and electric heating means; an infrared radiation copying device including second transporting means located in said housing means adjacent said outlet means for transporting said superimposed sheets out of said outlet, and a source of infrared radiation; drive means for simultaneously driving said first and second transporting means; and circuit means connecting said electric heating means and said source of infrared radiation, and including switch means having a first position for energizing said electric heating means while de-energizing said source of infrared radiation so that when a negative and a heat sensitive sheet are supplied through said inlet, said first and second transporting means transport the same out of said outlet while a positive copy is made on said heat sensitive sheet by said heat radiation copying device, said switch means having a second position for de-energizing said electric heating means and energizing said source of infrared radiation so that when said sheet with said positive copy and another sheet are supplied through said inlet, said first and second transporting means transport the same out of said outlet while a copy of said positive copy is made on said other sheet by said infrared radiation copying device.

10. Copying apparatus having three separate sources of radiation for use sequentially to produce a copy comprising a first copying device including a first electric source of visible light for making a negative copy of an original on a light sensitive sheet; a second copying device including a second electric source of invisible heat radiation for making a positive copy of said negative copy on a heat sensitive sheet; a third copying device including a third electric source of infrared radiation for making a thermocopy of said positive copy on a sheet sensitive to infrared radiation; circuit means connecting said first, second, and third electric sources, and including switch means for energizing said first electric source to make a negative copy of said original, for energizing said second electric source to make a positive copy of said negative copy on a heat sensitive sheet, and for finally energizing said third electric source for making a thermocopy of said positive copy on a sheet sensitive to infrared radiation; and common housing means at least for said second and third copying devices, said first copying device being disposed in the top portion of said housing means; said second and third copying devices including transporting means for transporting sheets, drive means for said transporting means, and guide means for guiding transported sheets into, through, and out of said housing means irrespective of which of said second and third sources is energized; said guide means having an outlet for sheets, located in said top portion of said housing means, and an inlet for sheets, located in a front portion of said housing means.

* * * * *